United States Patent
Chang et al.

(10) Patent No.: US 8,260,815 B2
(45) Date of Patent: *Sep. 4, 2012

(54) SYSTEM AND METHOD FOR ACCESSING NON-COMPATIBLE CONTENT REPOSITORIES

(75) Inventors: Mann Chang, Irvine, CA (US); Vladimir Fridman, Bellevue, WA (US); Lauren Mayes, Laguna Beach, CA (US); Scott P. Mills, Sammamish, WA (US); Daniel S. Whelan, Dana Point, CA (US)

(73) Assignee: International Business Machines Corporation, Armonk, NY (US)

( * ) Notice: Subject to any disclaimer, the term of this patent is extended or adjusted under 35 U.S.C. 154(b) by 267 days.

This patent is subject to a terminal disclaimer.

(21) Appl. No.: 12/276,244

(22) Filed: Nov. 21, 2008

(65) Prior Publication Data

US 2009/0077043 A1 Mar. 19, 2009

Related U.S. Application Data

(63) Continuation of application No. 10/745,474, filed on Dec. 23, 2003, now Pat. No. 7,483,879.

(60) Provisional application No. 60/441,512, filed on Jan. 17, 2003, provisional application No. 60/505,017, filed on Sep. 17, 2003.

(51) Int. Cl.
*G06F 7/00* (2006.01)
*G06F 17/30* (2006.01)

(52) U.S. Cl. ..................... 707/791; 707/802

(58) Field of Classification Search .............. 707/791, 707/792, 796, 803, 809, 192
See application file for complete search history.

(56) References Cited

U.S. PATENT DOCUMENTS

| | | | |
|---|---|---|---|
| 5,699,526 A | 12/1997 | Siefert | |
| 5,721,906 A | 2/1998 | Siefert | |
| 5,828,842 A | 10/1998 | Sugauchi et al. | |
| 5,974,444 A | 10/1999 | Konrad | |
| 6,026,403 A | 2/2000 | Siefert | |
| 6,084,585 A | 7/2000 | Kraft et al. | |
| 6,085,030 A * | 7/2000 | Whitehead et al. | 709/203 |

(Continued)

OTHER PUBLICATIONS

U.S. Appl. No. 12/175,424, filed Jul. 17, 2008, entitled "Component Integrator", invented by M. A. Marin, D.S. Whelan, & M.G. Winter, 26 pp.

(Continued)

*Primary Examiner* — Robert Beausoliel, Jr.
*Assistant Examiner* — Hexing Liu
(74) *Attorney, Agent, or Firm* — Janaki K. Davda; Konrad Raynes & Victor LLP (57) ABSTRACT

Systems and methods access non-compatible content repositories that are not natively accessible to a content management system. A metadata registry maintains metadata about content stored in both compatible and non-compatible repositories. For content in a non-compatible repository, the metadata indicates a repository interface capable of accessing the non-compatible repository. The content manager communicates with the repository interfaces to access the content in non-compatible repositories. The content manager may receive a request for content in a non-compatible repository, refer to the metadata registry to select a repository interface to employ, transmit a request for the requested content to the selected repository interface, and receive the requested content from the repository interface. A repository interface registry maintains information about available repository interfaces. Entries may be added to either the metadata registry and the repository interface registry, thus allowing the systems and methods to be extended to be able to access additional non-compatible repositories.

8 Claims, 6 Drawing Sheets

U.S. PATENT DOCUMENTS

| | | | |
|---|---|---|---|
| 6,134,559 | A | 10/2000 | Brumme et al. |
| 6,138,170 | A | 10/2000 | Matheson |
| 6,141,697 | A | 10/2000 | Hale et al. |
| 6,141,723 | A | 10/2000 | Lyons |
| 6,151,638 | A | 11/2000 | Hale et al. |
| 6,192,418 | B1 | 2/2001 | Hale et al. |
| 6,208,345 | B1 | 3/2001 | Sheard et al. |
| 6,289,391 | B1 | 9/2001 | Smith et al. |
| 6,480,855 | B1 | 11/2002 | Siefert |
| 6,484,217 | B1 | 11/2002 | Fuente et al. |
| 6,516,356 | B1 | 2/2003 | Belknap et al. |
| 6,529,894 | B1 | 3/2003 | Haeri et al. |
| 6,601,057 | B1 | 7/2003 | Underwood et al. |
| 6,604,241 | B1 | 8/2003 | Haeri et al. |
| 6,721,713 | B1 | 4/2004 | Guheen et al. |
| 6,904,454 | B2 | 6/2005 | Stickler |
| 6,959,339 | B1 | 10/2005 | Wu et al. |
| 6,973,626 | B1 | 12/2005 | Lahti et al. |
| 7,197,700 | B2 | 3/2007 | Honda et al. |
| 7,415,716 | B2 | 8/2008 | Marin et al. |
| 7,657,436 | B2 | 2/2010 | Elmore et al. |
| 2001/0039594 | A1 | 11/2001 | Park et al. |
| 2002/0129016 | A1 | 9/2002 | Christfort et al. |
| 2002/0133635 | A1 | 9/2002 | Schechter et al. |
| 2002/0178037 | A1 | 11/2002 | Reading et al. |
| 2003/0055668 | A1 | 3/2003 | Saran et al. |
| 2003/0187821 | A1* | 10/2003 | Cotton et al. .................. 707/1 |
| 2004/0010520 | A1 | 1/2004 | Tsang et al. |
| 2004/0054747 | A1 | 3/2004 | Breh et al. |
| 2004/0205075 | A1 | 10/2004 | LaTurner et al. |
| 2004/0205613 | A1* | 10/2004 | Li et al. ..................... 715/523 |

OTHER PUBLICATIONS

Amendment 1 for U.S. Appl. No. 10/745,474, dated Oct. 9, 2006, 9 pp.

Amendment 2 for U.S. Appl. No. 10/745,474, dated May 9, 2007, 13 pp.

Amendment 3 for U.S. Appl. No. 10/745,474, dated Nov. 27, 2007, 11 pp.

Amendment 4 for U.S. Appl. No. 10/745,474, dated May 19, 2008, 6 pp.

Notice of Allowance 1 for U.S. Appl. No. 10/745,474, dated Sep. 2, 2008, 12 pp.

Office Action 1 for U.S. Appl. No. 10/745,474, dated Jul. 27, 2006, 17 pp.

Office Action 2 for U.S. Appl. No. 10/745,474, dated Jan. 12, 2007, 17 pp.

Office Action 3 for U.S. Appl. No. 10/745,474, dated Jul. 27, 2007, 13 pp.

Office Action 4 for U.S. Appl. No. 10/745,474, dated Feb. 19, 2008, 17 pp.

Preliminary Amendment 1 for U.S. Appl. No. 10/745,474, Oct. 1, 2004, 7 pp.

* cited by examiner

FIG. 1

Metadata Registry 200

| Compatible Repository ID | Title | Date Created | Type | Keywords | ... | Property N | Identifier (External Reference Metadata) |
|---|---|---|---|---|---|---|---|
| 00000A1 | Memo | 04/11/2001 | Word | Expenses | | | N/A |
| 00000B2 | Legacy Graphic | 09/19/1993 | TIFF | Forms | | | filenet:/extserviceX?LibraryName=Forms&ID=ABC&Type=Graphic&Page=4 |
| * * * | | | | | | | |
| 00000C3 | My Database | 12/03/2000 | Oracle | Payroll | | | filenet:/extserviceY?FileName=payroll&Office=Costa Mesa&EmployeeID=001 |

SYSTEM AND METHOD FOR ACCESSING NON-COMPATIBLE CONTENT REPOSITORIES

REFERENCE TO RELATED APPLICATIONS

This application is a continuation of and claims the benefit of U.S. Pat. No. 7,483,879, issued on Jan. 27, 2009, entitled "SYSTEM AND METHOD FOR ACCESSING NON-COMPATIBLE CONTENT REPOSITORIES", having Application Ser. No. 10/745,474, filed Dec. 23, 2003, which application claims the benefit of U.S. Provisional Application No. 60/441,512, which was filed Jan. 17, 2003 and U.S. Provisional Application No. 60/505,017, which was filed Sep. 17, 2003, each of which is hereby incorporated in its entirety by this reference. This application is related to U.S. Pat. No. 7,415,716, issued on Aug. 19, 2008, having U.S. patent application Ser. No. 10/745,463, titled entitled "Component Integrator"; U.S. patent application Ser. No. 10/745,346, entitled "System and Method for Directing Content Entry": and U.S. patent application Ser. No. 12/175,424, entitled "Component Integrator", each of which is hereby incorporated in its entirety by this reference. Thus, the foregoing applications are hereby incorporated in their entirety by these references.

BACKGROUND OF THE INVENTION

1. Field of the Invention

Aspects of the invention are related to the access of content storage systems or repositories to retrieve content when the protocols, method and location of storage, the user interface, or programming interface for accessing the content storage systems or repositories are not native to a content management system.

2. Description of the Related Art

In recent years, organizations have faced an increasingly large burden of managing content. In response to this increased burden, many organizations employ a variety of content management systems in order to address specific departmental needs, house a particular department's content, or more effectively store, retrieve, index, search, edit, approve, publish, and otherwise manipulate content. These systems often are provided by different vendors, and often use a variety of proprietary and sometimes incompatible user interfaces, application programming interfaces, and data access protocols and methods for accessing content. In light of the foregoing, multi-departmental organizations can have difficulty sharing content between and among departments, even within one organization. Accessing content outside of an organization may be even more difficult.

Content management systems have typically responded to this need by attempting to natively support a number of content retrieval methods, interfaces, and protocols. Providing native support for every retrieval method, interface, and protocol, however, often costs significant resources, including development time and money. These costs impede developers' ability to natively support a wide-range of methods, interfaces, and protocols. As a result, content management systems are most likely to natively support well-known and widely-used methods, interfaces, and protocols for accessing content, such as, for example, the Hypertext Transfer Protocol ("HTTP"). Even very expensive content management systems are less likely to support methods, interfaces, and protocols that are proprietary, less well-known, not widely-used, or the like.

In addition, many organizations store vast amounts of content. For a variety of reasons, content management systems may not want to natively access these content repositories. Content repositories that cannot be natively accessed by a content management system because they are accessible only through methods, interfaces, and protocols not supported by the content management system are referred to herein as "non-compatible content repositories," or "external content repositories." Note that the phrase "external content repository," as used herein, is equivalent to "non-compatible data repository," and has no reference to a geographical, logical, or any other location of any particular content. An "external content repository" may, for example, be located within the same computer that also houses the content management system for which the repository is "non-compatible." To access content stored on non-compatible repositories, organizations often convert or import the content to native repositories such that they may access that content. Such conversion or importation, however, may be time-consuming, expensive, and otherwise unwanted. For example, organizations with terabytes of content stored on proprietary legacy systems or repositories may not have the resources to transfer that content to a native repository. "Legacy" systems or content include their broadest ordinary meaning and include those applications or content in which a company has already invested considerable time and money.

Compounding the foregoing problems and drawbacks is that many organizations still want to access such legacy repositories and legacy content using legacy applications that will continue to be employed for various tasks, such as accounting, customer tracking, other proprietary systems, or the like. Under these circumstances, importation of content may not even be an option as the content needs to remain available to these legacy systems.

The foregoing drawbacks and difficulties may deter many organizations from pursuing either conversion or importation. Therefore, such organizations may have some content accessible to some automated systems, while other content remains usable only to legacy systems.

SUMMARY OF THE INVENTION

This disclosure describes one or more systems and methods for accessing potentially non-compatible content repositories without requiring unduly expensive and time consuming content conversion or importation. Embodiments of the system allow registration of one or more repository interfaces, also referred to as external services, that may access content from one or more repositories, such as, for example, a proprietary external repository. Note that the term "external service" does not indicate any geographical, logical, or any other location, but refers to its function of accessing "external repositories," or "non-compatible content repositories;" an external service may be on the same computer on which the content management system resides, or may be in a different location.

As described herein, repository interfaces often perform the function of retrieving content from external storage repositories. A repository interface communicates with the external repository using, for example, one or more protocols understood by the external repository. Upon receiving content from the external repository, the repository interface transfers the content to the requesting system or application. A repository interface may also be configured to retrieve content from non-compatible repositories. A repository interface may be located on the local computer or an external computer accessible to the local computer via a network or other connection. Advantageously, providing repository interfaces at external network locations allows multiple users to access a repository service without requiring installation of the repository service on any of the users' computers, thus simplifying deployment of the repository interface.

In one embodiment, a content management system may access external reference metadata upon receipt of a request for content associated with the external reference metadata. The external reference metadata < may include, for example, a name identifying the content, the location of the repository that stores the content, the repository interface used for accessing the content, if any, and the like. The external reference metadata may be combined in one field or may comprise several fields. In one embodiment, a content management system manages the process of accessing both compatible and non-compatible content repositories. The content management system may determine whether the repository is accessible through a known protocol, such as, for example, a protocol native to the content management system. When the repository uses known protocols, the content management system may natively access the content with or without using a repository interface. On the other hand, when the content resides in a non-compatible repository, the content management system can retrieve location and/or identification information from the external reference metadata, and transmit a request to an appropriate repository interface. The interface accesses the appropriate repository, requests the content, and receives the content from the repository. The interface then returns the content to the requesting content management system. The content management system may also include a repository interface registry with recorded information about each repository interface. Such information may include a name that identifies each repository interface, the location of each repository interface, a template of a content identifier that each repository interface uses to uniquely identify content, any parameters that may be necessary to identify content to each repository interface, and the like.

After the content management system has acquired the requested content, the content management system may advantageously launch an appropriate application for viewing, editing, or otherwise manipulating the content, and/or launch one or more workflow processes relating to the content or actions associated with the content. For example, certain legacy applications may need to first open content stored in non-compatible repositories before it can be used.

The foregoing request handling by the content management system may advantageously be in response to a user request for content, a request by a software process, or the like. For example, a workflow process step or steps may be associated with the external reference metadata at design time. Then, during execution of the process step or steps, the content management system uses the external reference metadata to identify and retrieve the actual content through, for example, the repository interfaces and the non-compatible repository.

In one embodiment, the system may allow automated processes or users to add additional content to the metadata registry, or additional repository interfaces to a repository interface registry. For example, a graphical user interface or similar entry mechanism may prompt a user to enter information into fields of an entry in the metadata registry or the repository interface registry. Advantageously, the foregoing capability provides for extension of the content management system, such that the content management system may access additional non-compatible content repositories. Advantageously, the system allows the registration of repository interfaces designed and programmed by the provider of the content management system or even by third parties, such as, for example, providers of non-compatible content repositories. Advantageously, registering a repository interface is not dependent upon knowledge of the internal workings of the repository interface. Advantageously, in an embodiment, a registrant knows a location of the repository interface, an identification template that defines a format for a unique identifier that the repository interface uses to uniquely identify content, and parameters that are entered to identify content. As used herein, a "unique identifier" of specific content is an identifier that unambiguously identifies the specific content. Designers of repository interfaces may publish such information to aid registration of the repository interfaces.

Therefore, embodiments of the foregoing system provide access to local and non-local content stored within compatible and non-compatible repositories through, for example, proxy metadata. Proxy metadata refers to metadata that may take the place of content within a content management system, such that, to a user or automated process of the content management system, the metadata may appear to be stored within the content management system. In fact, the proxy metadata may not contain content, but a reference to that content to make it accessible, such as a reference to content within a non-compatible content repository. Additionally, the proxy metadata may contain useful information for categorizing the content and searching for the content, such as, for example, a title, a creation date, an author, keywords for searching, a content type, and the like. Such access to non-compatible content repositories may not be dependent upon content conversion or content importation. Furthermore, embodiments of the system allow providers of content management systems and third parties to extend the content management system's access capabilities beyond its native access capability.

Each of the foregoing advantages, or some of them, together with additional advantages recognized by a skilled artisan in light of this disclosure, may be achieved by various embodiments disclosed herein. A skilled artisan will appreciate, in light of this disclosure, how to practice the invention according to other embodiments that are not explicitly described herein. A skilled artisan will appreciate, in light of this disclosure, that each embodiment has its own characteristics and advantages, making each embodiment appropriate under given circumstances. Thus, the presence or lack of a certain characteristic or advantage in one embodiment does not in any way indicate the scope of the invention. Indeed, nothing within this disclosure, except for the claims, should be interpreted to limit the scope of the invention. The claims alone, and no other portion of this disclosure, define the invention.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention. Throughout the drawings, reference numbers are re-used to indicate correspondence between referenced elements. In addition, the first digit of each reference number indicates the figure in which the element first appears.

DETAILED DESCRIPTION OF THE PREFERRED EMBODIMENT

Often, in processing environments where one or more of content management systems, workflow processing systems, web content management systems, or the like organize, store and process content, content may be stored in any number and type of content repositories. An exemplary environment can include one or more processes, applications, or systems, that govern some or all of: content defining and handling; definable business process execution; security management; versioning; public and private web publication; performance monitoring; replication; storage management; legacy systems compatibility; and the like. In some environments, content may be added, manipulated, modified," and deleted. Additionally, metadata describing and identifying the content, such as for example, an identifier, keywords for searching for the content, a location for the content, information about how, where, when, or by whom content is collected, stored, formatted, and the like may be added, manipulated, modified, and deleted in place of or in addition to the content. For example, the following disclosure includes systems and processes that, in an exemplary embodiment, execute within or in conjunction with content management software commercially available from FileNet Corporation of Costa Mesa, Calif., marketed under the names of "FileNet Business Process Manager," "FileNet Content Manager," and "FileNet Web Content Manager," the details of which are incorporated herein by reference.

"Content" as used herein is a broad term, encompassing all types of content that can be managed by one or more of the foregoing systems as understood by a skilled artisan. Examples of such content include all types of electronic data, including binary data, structured data, such as are stored in databases, unstructured data, such as image documents, folders, word processing documents, CAD/CAM documents, source code files, object code files, web pages, web page descriptions, physical documents, physical objects, and the like. Content management systems are able to manage physical documents and objects not because the physical documents and objects reside within content management systems, but because the content management systems store metadata about the physical documents and objects.

In the foregoing and other processing environments, a need exists to access content across often differing content storage platforms, or repositories. For example, a legacy accounting application may create large amounts of financial content that could be useful to other processing systems. Moreover, an executive may wish to compile reports or the like using the legacy financial content from within a content management system. Alternatively, or in addition, one or more workflow processes executed by a workflow processing system may dictate that a reviewer periodically review various specific legacy financial content. As can be seen from the foregoing example, a need exists for a system that can provide access to the legacy content to a content management system and a workflow processing system.

The present disclosure includes a content manager that tracks metadata in order to supply client applications, server applications, and/or workflow processing systems with the content they request even when such content is stored within a non-compatible repository. The metadata includes external reference metadata containing location information and information as to one or more external services or repository interfaces that can act as the go-between to ensure requests for content are filled and other information about the content, such as, for example, a title, a date and time created, a date and time last modified, an author, keywords for searching, and the like. By using the metadata and the one or more repository interfaces, a content management system advantageously provides for seamless access to content stored on compatible and non-compatible repository systems without expensively importing the content from the non-compatible repositories to the compatible ones. As mentioned in the foregoing, such importation may have negative consequences for existing and potentially highly needed legacy systems.

To facilitate a complete understanding of the invention, the remainder of the detailed description describes the invention with reference to the figures, wherein like elements are referenced with like numerals throughout.

Figure 1:
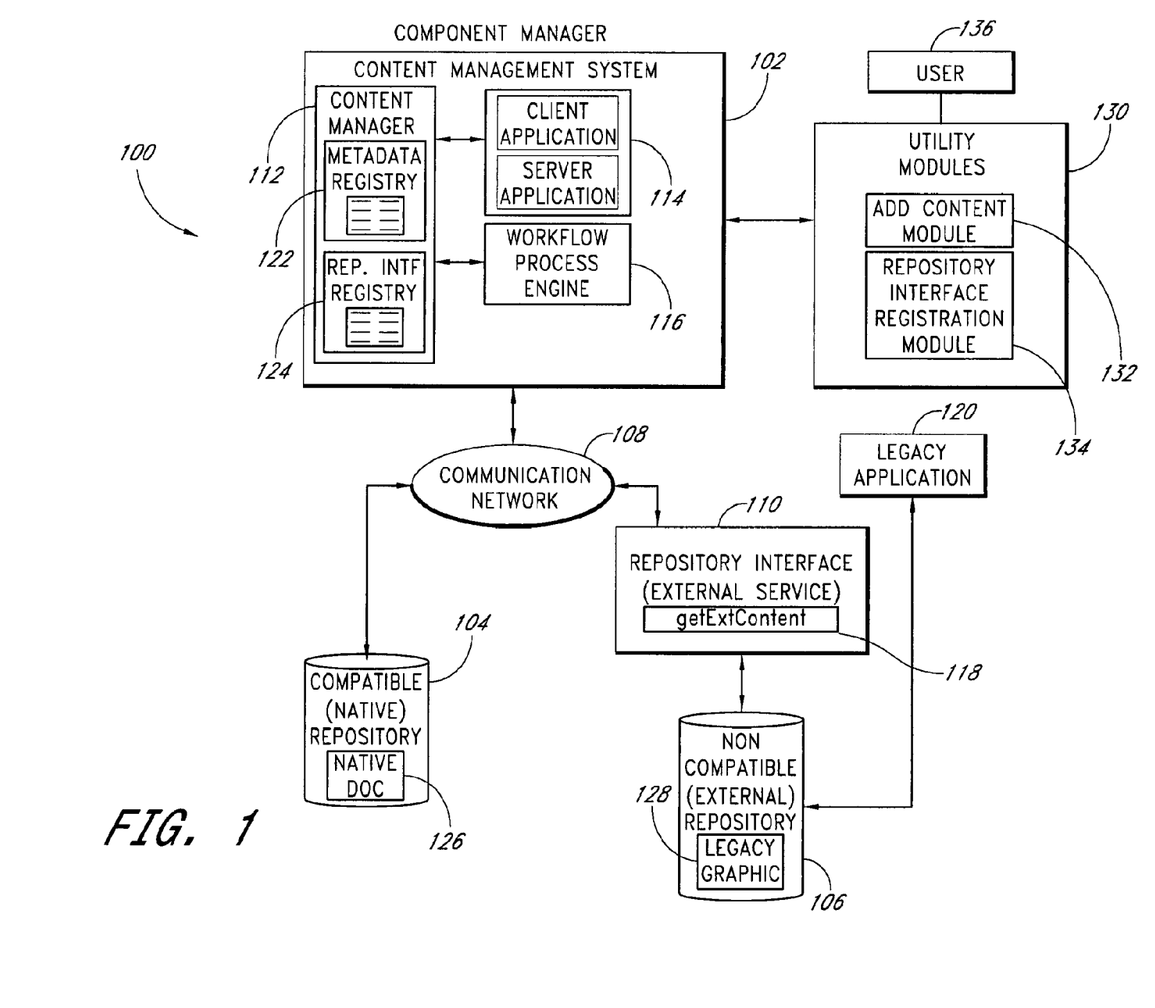
FIG. 1 is a block diagram illustrating an exemplary embodiment of a content management and workflow processing system capable of non-compatible content repository access.

FIG. 1 is a block diagram illustrating an exemplary embodiment of a content management and workflow processing system 100 capable of accessing a wide variety of content repository systems, including non-compatible content repository systems. As shown in FIG. 1, the system 100 comprises a content management system 102 communicating with one or more compatible or native repository systems 104 and one or more non-compatible or external repositories 106 through one or more communication networks 108, and in the case of the external repository 106, one or more repository interfaces 110. The repository interfaces 110 may also be referred to herein as external services.

In general, the content management system 102 may include a content manager 112, one or more applications 114, including client applications, server applications, or applications that are a combination of client applications and server applications, and a workflow process engine 116. In an embodiment, the content manager 112 receives requests for content from the applications 114 or the workflow process engine 116, and processes the requests to obtain the requested content. For example, the content manager 112 may determine that the request is for content stored on the native repository 104, and may simply request the content from the same through the communications network 108. Alternatively or additionally, the native repository 104 may be located on the same computer as the content management system 102, in which case the content manager 112 may directly request content from the native repository 104 without using the communications network 108. On the other hand, the content manager 112 may determine that the requested content is stored within the external repository 106, and may employ one or more of the external services 110 to retrieve the content. For example, the repository interface or external service 110 may include a variety of functions, processes, or methods, such as, for example, the displayed getExtContent method 118 that communicates with the external repository 106 to acquire the requested content. In one embodiment, methods included in the external service 110, such as the getExtContent method 118, are implemented using Java servlets. However, any programming language or scripting language capable of constructing functions, methods, procedures, operations, and the like for communicating with a content repository may be used. According to an embodiment, legacy applications 120 may continue to access, modify, and delete content from the external repository 106 directly.

In an embodiment, the content manager 112 also includes a metadata registry 122 and a repository interface registry 124. The metadata registry 122 may comprise a data structure, such as one or more tables or objects that associate various metadata with requestable content registered with the content management system 102. The metadata registry 122 will be disclosed in greater detail herein with respect to the disclosure referencing FIG. 2.

The repository interface registry 124 may comprise a data structure, such as one or more tables or objects that associate each repository interface 110 with location and identifier information usable to define a format for requests to the repository interface 110. The repository interface registry 124 will be disclosed in greater detail herein with respect to the disclosure referencing FIG. 3.

The compatible repository 104 may comprise one or more content storage systems native to the content management system 102 storing all types of content. FIG. 1 shows the compatible repository 104 including exemplary content illustratively titled "Native Document" 126. Internally, the content management system 102 may identify the document using a code, such as for example, "OOOOOA1." Similarly, the external repository 106 may comprise one or more content storage systems incompatible with the content management system 102 storing all types of content. FIG. 1 also shows the external repository 106 including exemplary content illustratively titled "Legacy Graphic" 128. Again, internally the content management system 102 may identify this content by a code, such as, for example, "00000B2."

The communication network 108 may comprise one or more computer networks, including but not limited to, one or more connected public or private networks including the World Wide Web and/or the Internet, LANs, WANs, public phone networks, kiosk systems, ATM or other communication systems, messaging systems, wired or wireless systems, combinations of the same or the like that provide for data communication between two computing systems.

While the non-compatible content repositories 106 and the compatible content repositories 104 are shown, for ease of understanding, as being separate physically, a skilled artisan will appreciate, in light of this disclosure, that a single repository may contain both compatibly accessible content and non-compatibly accessible content, and that such a repository may be treated as a compatible repository when requesting compatible accesses, and as non-compatible when requesting non-compatible accesses.

Generally, the content management system 102 manages a wide variety of content, including, for example, all types of electronic data, -including binary data, structured data, such as are stored in databases, unstructured data, such as image documents, word processing documents, CAD/CAM documents, source code files, object code files, web pages, web page descriptions, physical documents, physical objects, and the like. The content management system 102 provides tools that allow powerful processing of this content, including indexing, categorizing, editing, versioning, comparing, deleting, approving, and the like. A skilled artisan will appreciate in light of this disclosure that some of the foregoing processing features may not be available for certain forms of content.

In addition, the content manager 112 may be configured to load any received content into one or more of the applications 114, or to launch one or more of the applications 114. As illustrated, the applications 114 may comprise client applications, server applications, or any combination of client and server applications. This allows a user to use the applications 114 to, for example, view, edit, or otherwise manipulate the received content. Moreover, the content manager 112 may communicate with the workflow engine 116. The workflow engine 116 will be understood by a skilled artisan, in light of this disclosure, to encompass its ordinary meaning in the broadest sense and to include a workflow engine as found in commercially available business process management systems, such as "FileNet Business Process Manager," a business process management system publicly available from FileNet Corporation of Costa Mesa, Calif.

Figure 2:
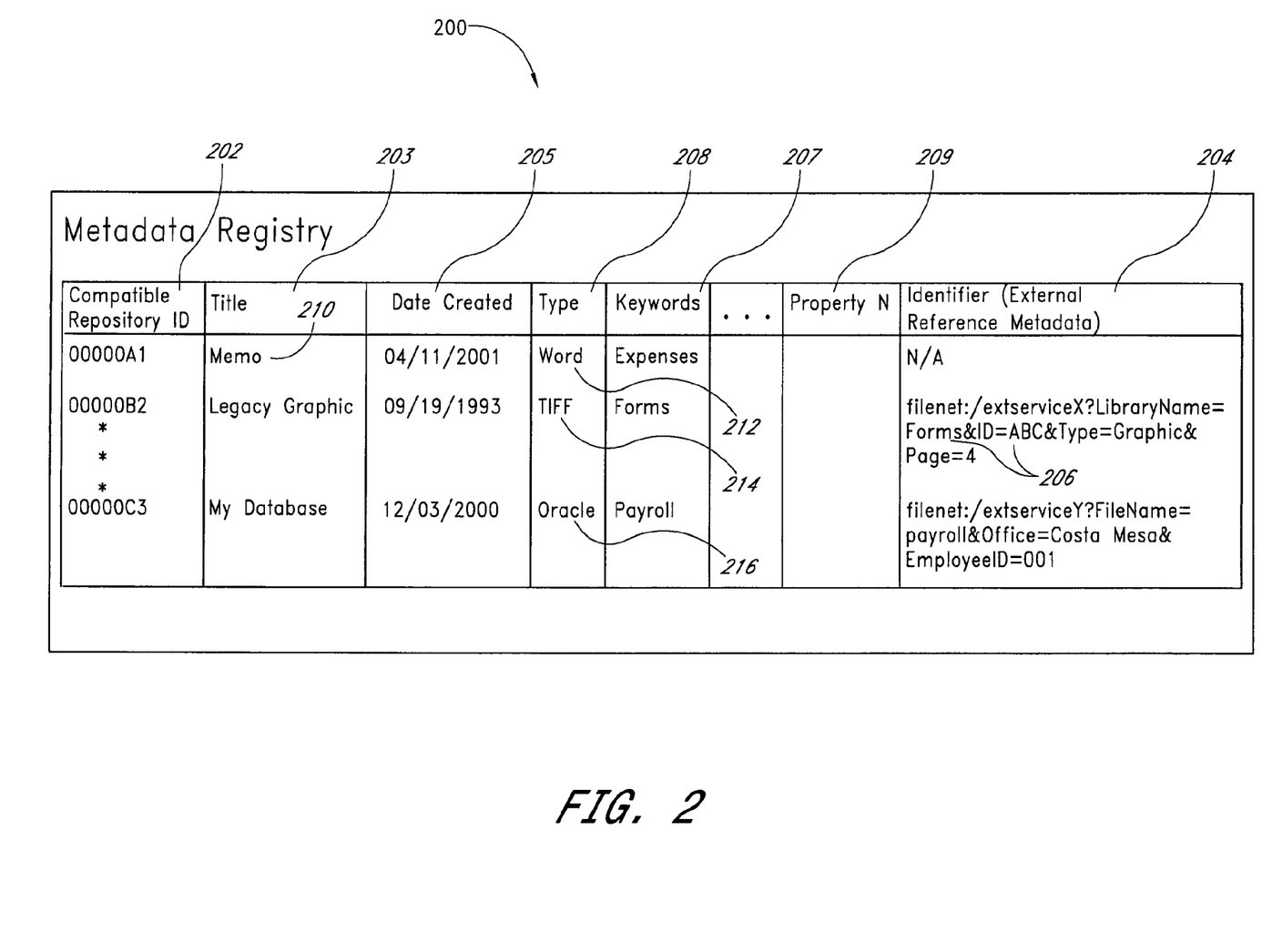
FIG. 2 is a table illustrating a simplified exemplary embodiment of types of metadata that can be stored and traced in the system of FIG. 1.

FIG. 1 also includes one or more utility modules 130, such as, for example, an add content module 132 and a repository interface registration module 134, each usable by the user 136 or other processes or applications to interact with the content management system 102. According to an embodiment, the user 136 or another process or application may interact with the content manager 112, to request particular content. While the user 136 or process may not know details about where the particular content is located or whether that location provides native or external access, the content manager 112 stores these details in, for example, the metadata registry 122. In an embodiment, the metadata registry 122 maintains external reference metadata for each content item that sufficiently identifies the content such that it can be accessed. Additionally, the metadata registry 122 may contain other information about the content, such as for example, a title, keywords for searching, a creation date and time, a last modified date and time, a content type, an object class, and the like. A skilled artisan will appreciate, in light of this disclosure other metadata that may be stored. A skilled artisan will also appreciate, in light of this disclosure, that some metadata fields may not be appropriate for all forms of content. By combining metadata and external reference metadata 204 into a single metadata registry 122, or into two or more linked registries, the content management system 102 enables the user 136 or automated process to perform, on data residing in non-compatible content repositories, some or all of the powerful content processing features provided by content management systems, including, for example, searching and categorizing the content based on the metadata. FIG. 2 is a table 200 illustrating a simplified exemplary embodiment of types of metadata, including external reference metadata 204, that can be accessed by the system 100 of FIG. 1. As illustrated, the metadata may comprise, for example, a compatible repository ID 202, a content title 203, a date created field 205, a content type 208, keywords 207, other properties 209, external reference metadata 204, and the like.

In one embodiment, the compatible repository ID 202 may comprise an alphabetic, numeric, or alphanumeric code that identifies a particular content item to the content management system 102. The content title 203 may provide a text string for identifying the data to a user 136 much like a file name as used in a typical file system of an operating system. In one preferred embodiment, the external reference metadata 204 may identify, if applicable, a repository interface 110 for accessing the content. A skilled artisan will appreciate, in light of this disclosure, that the external reference metadata 204 could, alternatively or additionally, identify more than one repository interface 110 that is able to access the content. If the access to the content is compatible with the content management system 100, such as, for example, the illustrated "Memo" file 210, the external reference metadata 204 may be an empty set, marked "N/A" for not applicable, or some similar indicator. The external reference metadata 204 may include parameter values 206 that assist in uniquely or otherwise identifying the content item and an appropriate repository interface.

A skilled artisan will appreciate, in light of this disclosure, that the various repository interfaces may have different identification schemes. As such, the content of each parameter value 206 may mean different things to different repository services. In addition, the content format may indicate a format for viewing or manipulating the content, such as, in the exemplary metadata shown, Microsoft Word's content format (.doc) 212, TIFF 214 for a type of image content, and Oracle 216, for Oracle database content.

It should be appreciated that the external reference metadata 204 stored in the metadata registry 122 may be transparent to the user 136 or requesting application or process. Advantageously, hiding from the user 136 details about how content is accessed allows the user 136 to view and manipulate content residing in compatible and non-compatible repositories without having to appreciate the technical distinction between the two. Advantageously, hiding the foregoing details may enhance any security associated with the content management system 102. In some cases, it may be or become desirable for the user 136, requesting application, or requesting process to view the underlying external reference metadata 204, or to understand what type of content he or she is viewing, and the content management system 102 may provide tools for allowing such detailed access. Such tools may include security features, such as password protection, that ensure that only authorized users have access.

The content manager 112 refers to the metadata registry 122 for sufficient identifying information to access the content requested by the user 136 or process. According to an embodiment, the content manager 112 determines whether the content can be accessed through one or more compatible or non-compatible repositories. In one embodiment, if the external reference metadata field 204 contains "N/A" or a similar indication, the repository may be determined to be compatible. If the content is stored on a compatible system, the content manager 112 may request the content directly from, for example, the compatible content repository 104.

Figure 3:
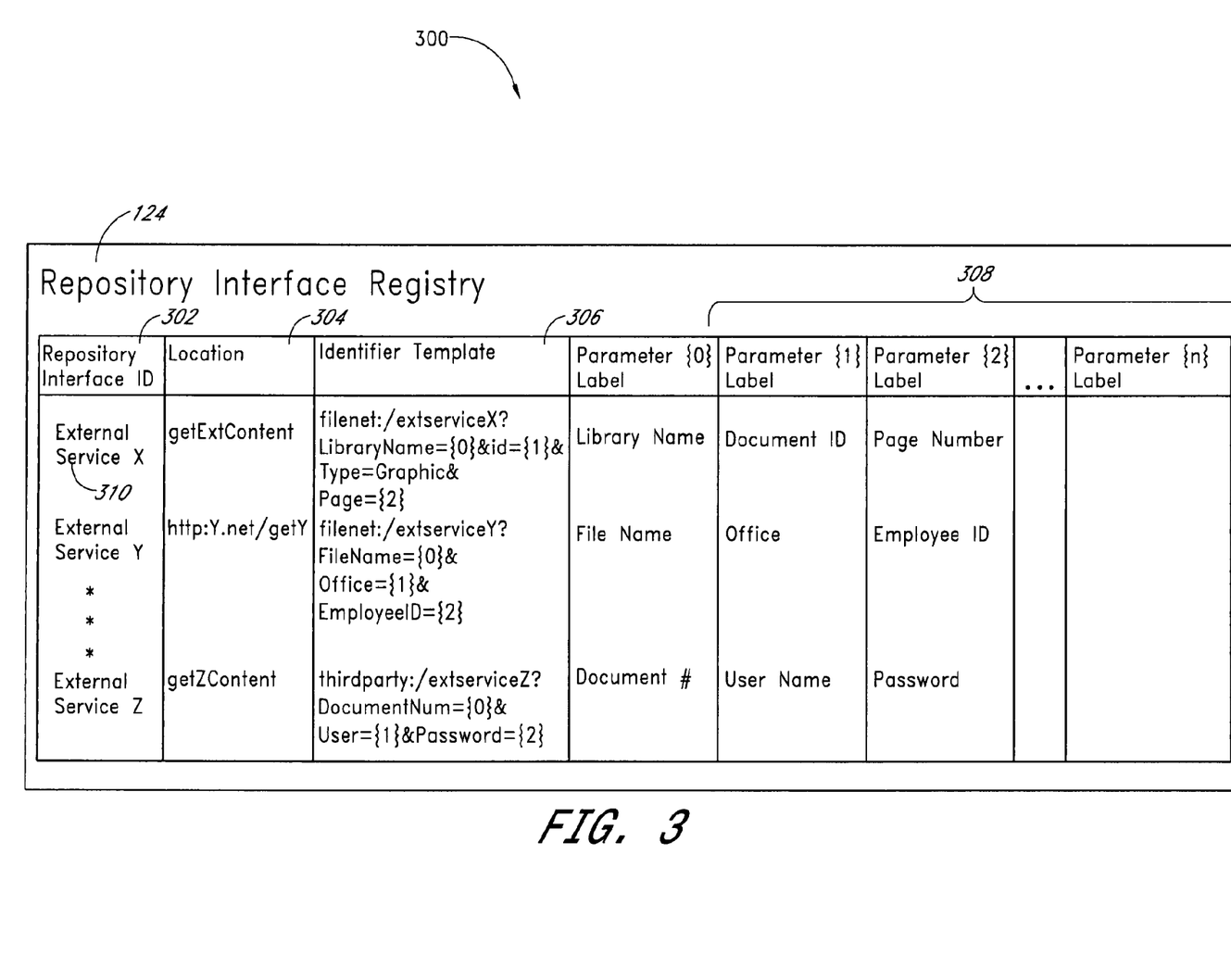
FIG. 3 is a table illustrating a simplified exemplary embodiment of a repository interface registry of FIG. 1.

As illustrated in FIG. 2, the content item with the title "Legacy Graphic" content item has an entry for the external reference metadata 204, and is therefore stored on a non-compatible repository, such as the repository 106. The content manager 112 generates a unique identifier based on the external reference metadata 204. In one embodiment, the external reference metadata 204 is the identifier and retrieving it from storage constitutes generating the identifier. Alternatively or additionally, the content manager 112 may seek additional information from the repository interface registry 124 to generate the identifier. FIG. 3 is a table 300 illustrating one embodiment of the repository interface registry 124. The repository interface registry 124 may comprise records with a repository interface ID 302, a repository interface location 304, an identifier template 306, and a plurality of parameter labels 308. The repository interface location 304 may specify a path for locating the repository interface 110, including the name of the method, procedure, function, or the like executed by the repository interface 110 to communicate with a content repository. For example, the repository interface location 304 for the repository interface 110 may be getExtContent 118, which, as illustrated in FIG. 1, is the name of the method executed by the repository interface 110. Additionally, the repository interface location 304 for a repository interface 110 located on an external network site may have a path, such as a URL, that identifies the network site, such as, for example: "http://myserver:8080/FileNet/getExtContent."

As indicated, according to one embodiment, a unique identifier for accessing particular content may be generated from information contained in the external reference metadata 204, or from some combination of information contained in the external reference metadata 204 and the repository interface registry 124. Such combination may be generated by an algorithm. An example of such a combination is now given with respect to the external reference metadata 204 entry for the content item titled "Legacy Graphic." As illustrated, the external reference metadata 204 for that content item is: "filenet:/extserviceX?LibraryName=Forms&ID=ABC&Type=Graphic&Page=4." The "filenet:/extserviceX" portion of this external reference metadata 204 indicates that this content item may be accessed using the "External Service X" 310 illustrated on FIG. 3. According to one embodiment, a unique identifier may be generated that combines some of the external reference metadata 204 with some of the information stored in the repository interface registry 124, such as, for example, the location 304, which is, in this example, "getExtContent." A generated identifier combining the location 304 information with a portion of the external reference metadata 304 may be, for example: "getExtContent? LibraryName=Forms&ID=ABC&Type=Graphic<<fePage=4."

Advantageously, generating an identifier by combining information from the metadata registry 122 and the interface repository registry 124 means that (1) the external reference metadata 204 need not be directly invokable, and (2) changes to information in the external repository interface 124, such as, for example, changes to location 304 information, need not require changing large numbers of records within the metadata registry 204. Avoiding changing large numbers of records within the metadata registry 204, which it is anticipated will generally be large, containing potentially millions of records, may save large amounts of computational resources. According to one advantageous embodiment, the identifier may be dynamically generated at run-time.

In an embodiment, the identifier template 306 defines a format that one or more of the repository interfaces 110 use to uniquely identify content. The identifier template 306 may have placeholders for receiving parameter values. The placeholders may be indicated, for example, by "{0}," "{1}," "{2}," or the like. In one embodiment, the identifier template may have the form of a Uniform Resource Identifier ("URI") as known in the art and defined in Request for Comment 2396 ("RFC 2396"), a document distributed by the Network Working Group and first published in August 1998, which is herein incorporated by reference in its entirety. However, an artisan will recognize from the disclosure herein many formats, such as, for example, a standard Uniform Resource Locator ("URL") known in the art. Following is one example of an identifier template, in the form of a URI: "filenet:/extserviceX?LibraryName={0}&id={1}&Type=Graphic&Page={2}"

A skilled artisan will appreciate that "filenet" identifies a URI scheme, "/extserviceX" identifies an absolute path for the content, such that this is the path from the root of an identified file system, and various variables following the "?" symbol define a query. The {0}, {1}, and {2} are placeholders indicating where actual parameter values should be inserted to form an actual identifier. The placeholders may be filled by actual parameter values, such as the parameter values 606, illustrated with regard to an add content module user interface 600 of FIG. 6, such that the filled template forms a unique identifier or external reference metadata 204, as shown in FIG. 2, that, when passed to the repository interface 110, enables the repository interface 110 to retrieve the requested content. In some embodiments, relative paths may be used instead of absolute paths. Additionally, a skilled artisan will appreciate, in light of this disclosure, that any form of unique identifier for content items may be used, in addition to or in place of URIs. Preferably, the form will be consistent throughout the content management system 102. For example, whereas an identifier in the form of a URI is a single string, an identifier may comprise more than one string. Such a multiple string identifier may be received by the repository interface 110 in a series of transmissions, or in a series of fields within one transmission. Herein, string is used generically to refer to any grouping of data regardless of data type, and may include, for example, numerical data types such as integers and real numbers, or character data types, string data types, and the like.

As shown, "External Service X," 310 which is the repository interface corresponding to the content with a "Legacy Graphic" title, is one entry in the repository interface registry 300. The location 304 or method corresponding to this repository interface is "getExtContent." For purposes of this example, "getExtContent" corresponds to the repository interface 110. In one embodiment, other repository interfaces may be located by use of a URL, such as, for example, "http:/myserver:8080/FileNet/getExtContent." A skilled artisan will appreciate that any alternative way to designate the location of repository interfaces is acceptable so long as the system is able to interpret the location and access the repository interface.

Returning to FIG. 1, the repository interface 110 may request the content from the non-compatible content repository 106. As illustrated, the non-compatible content repository 106 has a document titled "Legacy Graphic" 128. As illustrated in FIG. 2, metadata for this content is stored within the metadata registry 122. The non-compatible content repository 106 may process the content request, and in response, return the requested content, the "Legacy Graphic" 128 document, to the repository interface 110. The repository interface 110 may then transmit the requested content to the content manager 112. In one embodiment, the content management system 102 may load the requested content into one or more applications 114 that the user may use to view, edit, or otherwise manipulate the requested content. In one embodiment, the one or more applications 114 may save the content within the content management system 102. In one embodiment, after modification of the content using, for example, an application 114, a repository interface may also be used to upload the modified content to an appropriate repository. The same repository interface as used to initially access the content, or a different repository interface, may be used for this purpose.

Figure 4:
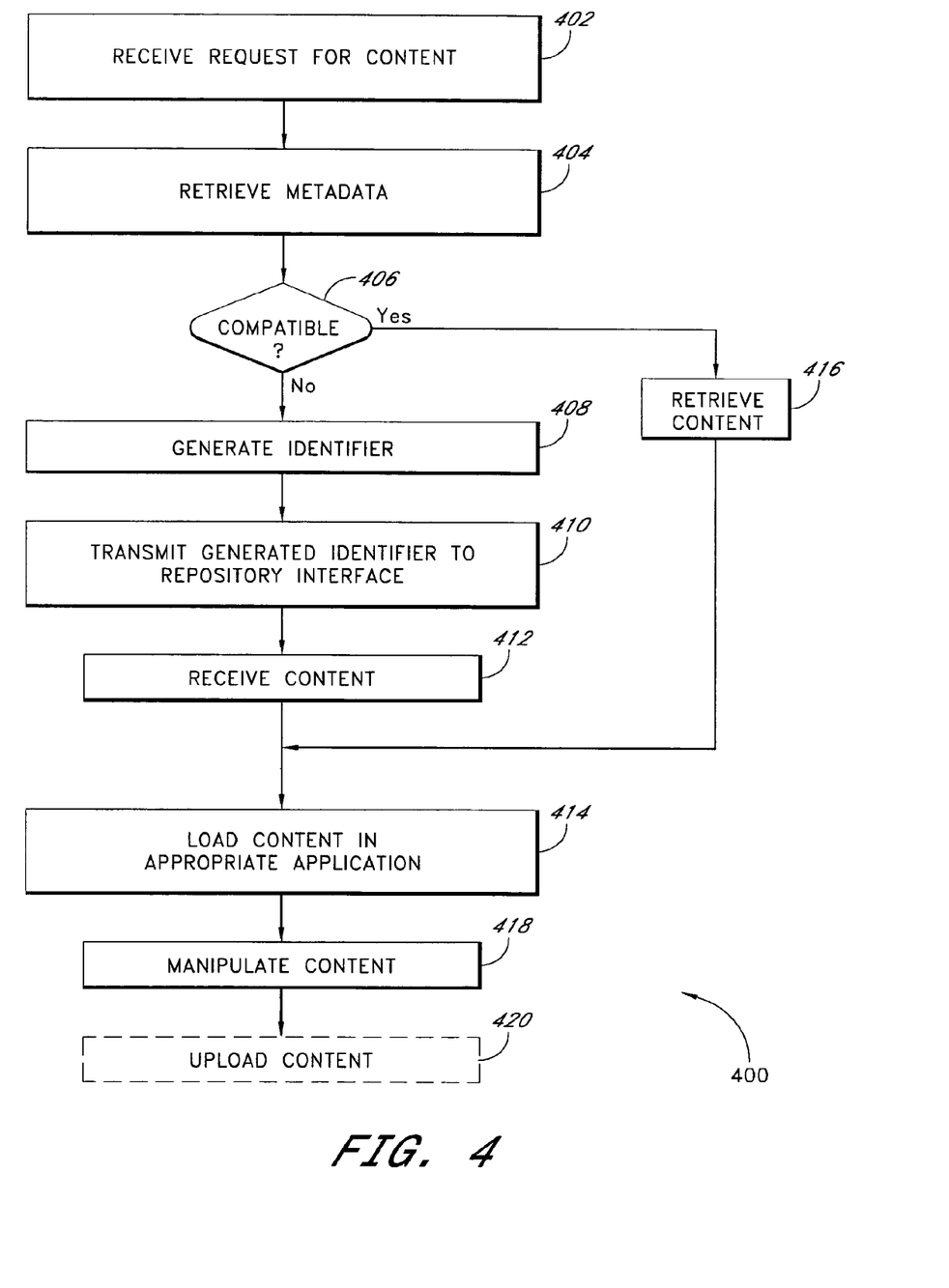
FIG. 4 is a flow chart illustrating an exemplary embodiment of a content accessing process capable of accessing non-compatible content repositories employable by the system 100 of FIG. 1.

FIG. 4 is an exemplary flowchart that illustrates a method of accessing content 400 performed in accordance with the features of the system 100. In a block 402, a request for content is received. In one embodiment, the content manager 112 receives the request. In a block 404, external reference metadata 204 about the requested content is retrieved. In one embodiment, the content manager 112 retrieves the external reference metadata 204 from the metadata registry 122. Based on the external reference metadata 204, the system may then determine, in a decision block 406, whether the requested content is stored in a compatible or non-compatible repository. In one embodiment, the content manager 112 makes this determination. If the requested content is stored in a compatible repository, the content may be accessed without using a repository interface, as shown in a block 416. In one embodiment, the content manager 112 performs this access. In a block 414, the accessed content may be loaded into an application for further processing. In one embodiment, the content manager 112 performs this loading.

If, in the decision block 406, the system determines that the content is stored in a non-compatible repository, the system may generate, in a block 408, a unique identifier of the content to be accessed, based on at least some of the external reference metadata 204, or based on at least some of the external reference metadata 204 in combination with at least some of the information stored in the repository interface registry 124. In one embodiment, such as illustrated in FIG. 2, the external reference metadata 204 may already be in the form of a unique identifier. Thus, according to one embodiment, the unique identifier is generated by retrieving it from storage. Additionally, according to one embodiment, the unique identifier may be partially or wholly constructed at run-time by an algorithm that utilizes the external reference metadata 204 and information stored in the repository interface registry 124, such as, for example by replacing the URI scheme and absolute path information in the external reference metadata 204 with corresponding repository interface location information 304 based upon a search of the repository interface registry 124.

The generated unique identifier may then be transmitted to a repository interface configured to access the content, as shown by a block 410. In one embodiment, the content manager 112 transmits the unique identifier to the repository interface. In one embodiment, the content manager 112 determines which repository interface to employ. The content manager 112 may make this determination by referring to the external reference metadata 204 that associates the selected content with a repository interface. In a block 412, the content may be received from the repository interface. In one embodiment, the content manager 112 receives the content. Additionally, the content may be displayed on a display device. Additionally, the content may be provided to a human user using a software application appropriate for the content type of the content.

In a block 414, the accessed content may be loaded into an application for further processing. In one embodiment, the content manager 112 performs this loading. The further processing may include, in a block 418, manipulation of the content. The further processing may include saving the content within the content management system 102. After processing, any modified content may be uploaded to the repository from whence it came, as shown in an optional block 420. The repository interface that initially accessed the content may perform this operation, or a different repository interface may be used.

Figure 5:
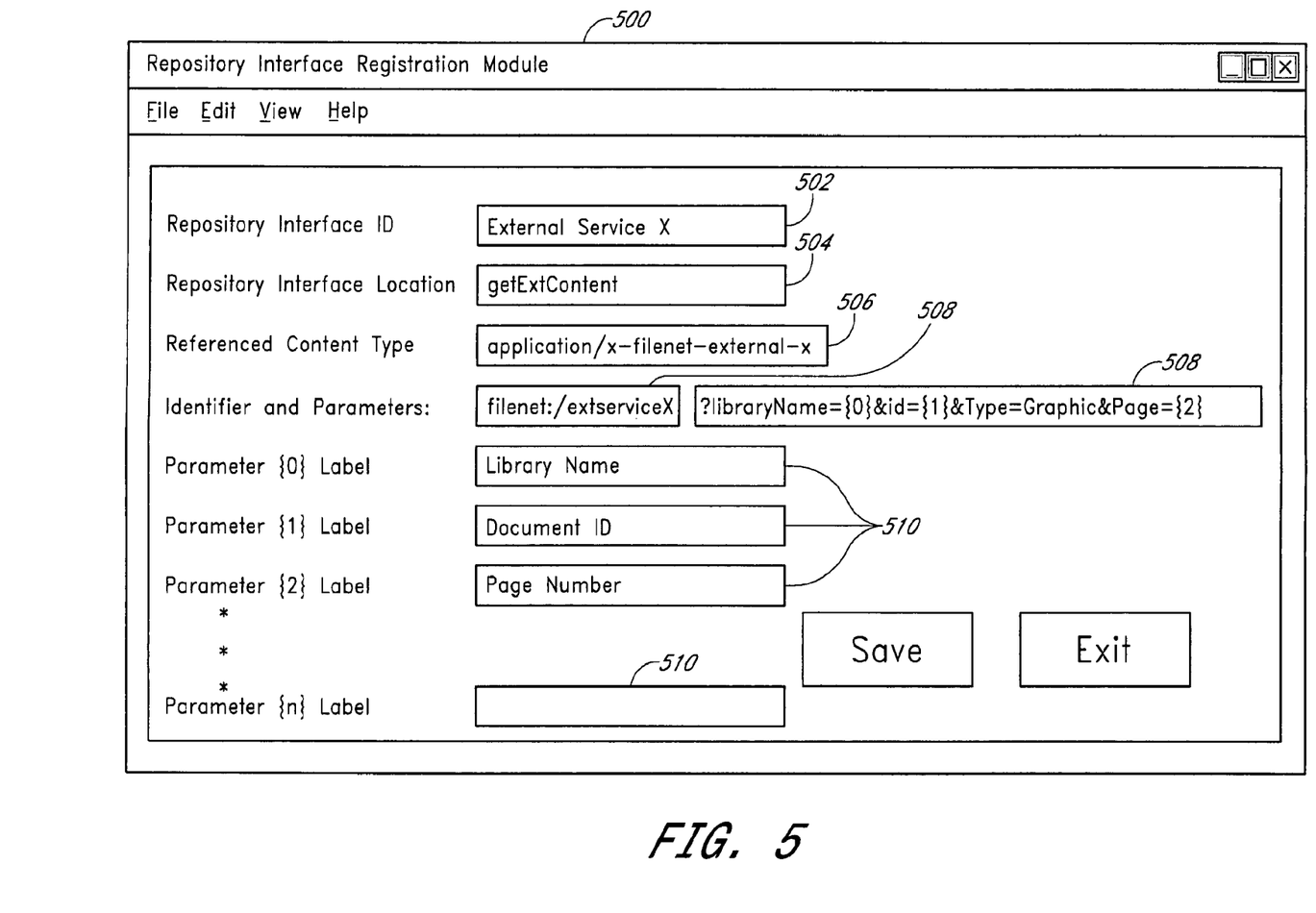
FIG. 5 is a screen shot illustrating an exemplary embodiment of a user interface for a repository interface registration module of the system of FIG. 1.

FIG. 5 is a screen shot of an exemplary embodiment of a repository interface registration module graphical user interface 500. In one embodiment, the user 136 uses the repository interface registration module graphical user interface 500 to enter all appropriate information for registering an additional repository interface. As illustrated, such appropriate information may include a repository interface ID 502, a repository interface location 504, a content type 506, one or more fields 508 for constructing an identifier template that defines the format of content identifiers received by the repository interface, and one or more parameter labels 510 for prompting a user, automated process, or data entry program, for parameters for accessing the content. A skilled artisan will appreciate, in light of this disclosure, that other fields may be provided for entry by the repository interface registration module graphical user interface 500. For example, a user may optionally be allowed to enter a format hint for each parameter label 510. A format hint may present helpful information to a user about what format is expected for a particular parameter label 510. For example, if a particular parameter requires a date, the format hint may be "Enter date in MM/DD/YYYY format." The repository interface location 504 may be within the content management system 102 or outside the content management system 102. The repository interface registry 124 supports repository interfaces that are both within and outside the content management system 102.

Advantageously, each repository interface may contain all code necessary to access a non-compatible content repository. Thus, advantageously the content manager 112 may not participate in the accessing of non-compatible content repositories beyond forwarding a request to a repository interface and waiting for a reply. In some embodiments, the content manager may perform additional access functions beyond the foregoing. Advantageously, the content manager 112 may be able to access a repository interface as soon as the repository interface has been registered, without requiring any additional modification to the content manager 112 or the content management system 102. In this way, the repository interface registration module 134 may provide a relatively straightforward user-friendly way to extend the capacity of a content management system 102 to access content. In some embodiments, modifications to the content manager 112 or the content management system 102, in addition to registering an additional repository interface, may be performed.

Figure 6:
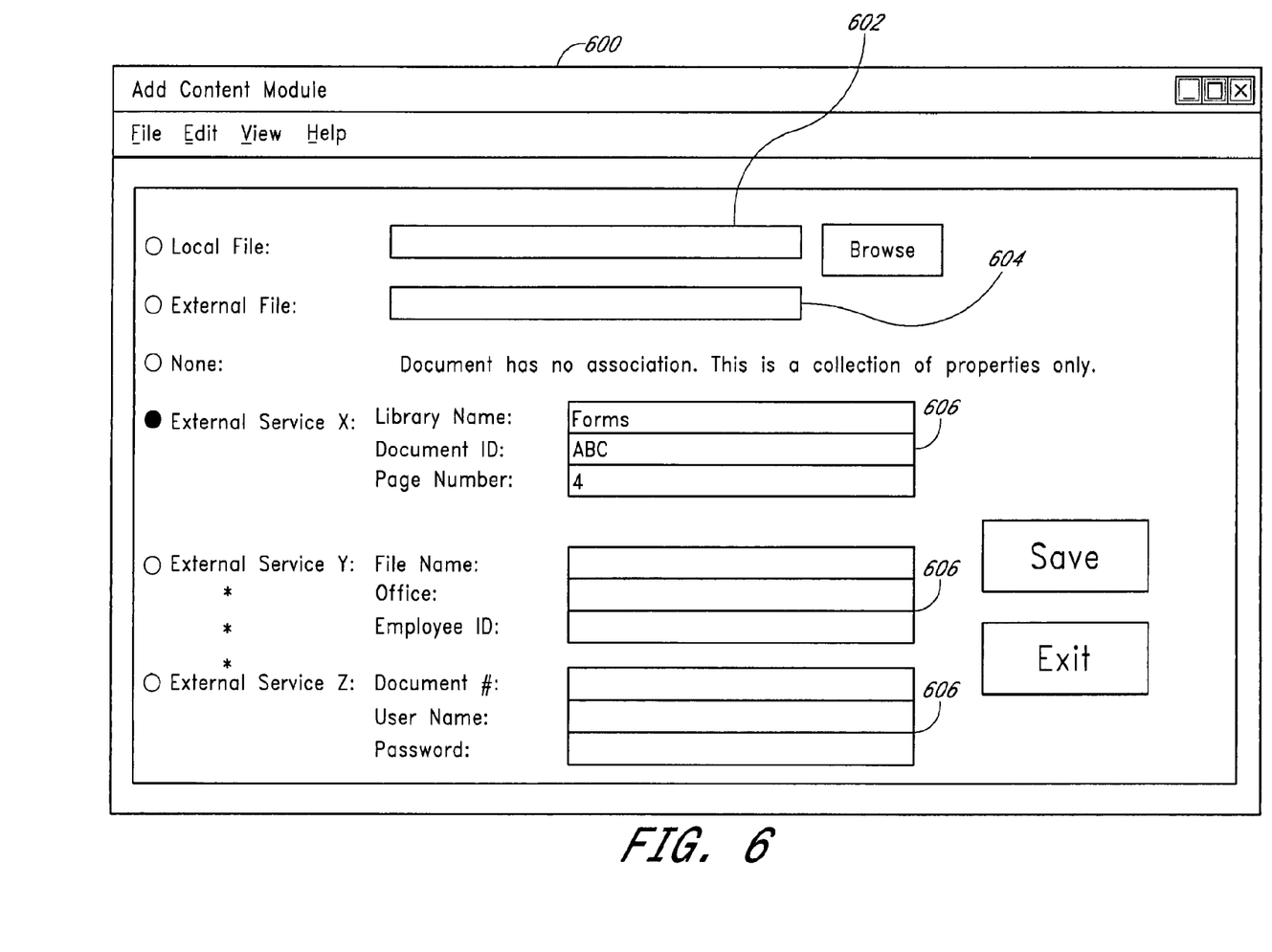
FIG. 6 is a screen shot illustrating an exemplary embodiment of a user interface for an add content module of the system of FIG. 1.

FIG. 6 is a screen shot of one exemplary embodiment of an add content module graphical user interface 600. In one embodiment, the add content module 132 provides a graphical user interface 600 that allows the user 136 or an automated process to enter metadata associated with content added to the content manager 112. A skilled artisan will appreciate in light of this disclosure that while user entry is illustrated by FIG. 6 that each of the content entry functions may also be performed by an automated process, such as by providing an interface that can interact with applications, including batch processors, that may be configured to add large amounts of content. For example, a batch processor may receive an electronic listing of content from an external repository and, based on the electronic listing, add each item of content to the metadata registry 122. As illustrated, the user 136 or automated process may identify local content stored in a compatible repository using a local compatible content entry box 602. The user 136 or automated process may identify non-local content stored in a compatible repository using a non-local compatible content entry box 604. The user 136 or automated process may identify both local and non-local content stored in non-compatible repositories by choosing a repository interface and entering one or more parameter values into one or more parameter value entry boxes 606. The user 136 or automated process may be allowed to select any repository interface registered in the repository interface registry 124. The parameter values to be entered into the parameter value entry boxes 606 may correspond to the parameters defined for each repository interface in the repository interface registry 124. Comparing FIG. 6 to FIG. 3, it should be appreciated that, as illustrated, the external services from which the user 136 or automated process may choose in this example, External Service X, External Service Y, and External Service Z, correspond to those registered in the exemplary repository interface registry 124 of FIG. 3. Additionally, it should be appreciated that the exemplary repository interface registry 124 of FIG. 3 defines the parameter value labels presented to the user 136 or automated process by the add content module user interface 600.

In one embodiment, each repository interface handles security issues related to accessing content from a non-compatible content repository. For example, a repository interface may identify itself to a non-compatible content repository using a user name and password, or may use any other security mechanism that will be appreciated by an artisan in light of this disclosure. In this way, the system advantageously ensures security and integrity of the content sought, without requiring the user 136 to know access parameters, such as passwords or the like, for every repository to be accessed. Additionally, access parameters may be stored in a format that cannot be read by the user 136, such as by being encrypted, to further enhance security. Advantageously, restricting the number of people that must know access parameters, and that could potentially abuse them, enhances overall security.

A skilled artisan will appreciate, in light of this disclosure, that the various components described herein can generally be combined into fewer components or divided into more components without fundamentally altering the structure or function of the embodiments described. For example, the functions of the content manager 112 described herein may be performed by the content manager 112 alone, or the content manager 112 may be divided into multiple modules. Additionally, the workflow process engine 116 may be part of the content manager 112. Additionally, the metadata registry 122 and the repository interface registry 124, or one of them may be separated from the content manager 112. Furthermore, the utility modules 130, or one of them, may be within the content management system 102. Moreover, one or more repository interfaces may be provided within the content manager 112. Additionally, compatible repositories 104, non-compatible repositories 106, or both, may be housed within the content management system 102 itself. All such embodiments, and any other such embodiments in which the components described herein are combined or divided but retain their properties do not fundamentally alter the structures or functions described herein, and are within the scope of this disclosure.

In light of this disclosure, a skilled artisan will appreciate that the disclosed system provides a secure, user-friendly way to access compatible and non-compatible repositories of content, without requiring each user to understand where each piece of content is located or which protocol is used to access the content. Furthermore, the disclosed system reduces or eliminates an organization's need to convert or import content stored in legacy systems.

The foregoing describes embodiments of the invention but does not define the invention. While several features of the various embodiments are advantageous, no such feature is an essential limitation of the invention. The claims alone, and no other part of this disclosure, define the scope of the invention.

What is claimed is:

1. A method of accessing content stored within a content management system, the method comprising:

storing, in the content management system, a metadata registry that identifies metadata for content stored in a native repository and metadata for content stored in an external repository, wherein the metadata for the content stored in the external repository includes external reference metadata that identifies an external service for accessing the content in the external repository, wherein the external repository accessible through a protocol that is incompatible with the content management system, and wherein the native repository is accessible through a protocol that is compatible with the content management system;

storing, in the content management system, an external service registry with records that each identify a particular external service for accessing content in the external repository location information that identifies a location of the external repository, and an identifier template that defines a format for a unique identifier that the particular external service uses to uniquely identify content and that has placeholders for parameter values;

receiving a request for content;

determining whether the request is for content stored in the native repository or the external repository by retrieving the external reference metadata from the metadata registry;

in response to determining that the request is for content stored in the native repository, directly accessing the native repository to retrieve the requested content; and in response to determining that the request is for content stored in the external repository, employing one or more external services to retrieve the requested content from the external service registry by:

retrieving the external reference metadata from the metadata registry to identify a particular external service configured to communicate with the external repository to acquire the requested content;

based on the identifier template, generating the unique identifier for the content to be accessed by combining at least a portion of the external reference metadata with at least a portion of the location information in the external service registry into the unique identifier that uniquely identifies the requested content to the particular external service;

transmitting the unique identifier to the particular external service, wherein the particular external service is configured to access the requested content in the repository based on the identifier;

receiving the requested content from the particular external service; and providing the requested content to one of a user, an application, and a process.

2. The method of claim 1, wherein the generated identifier is combined dynamically at run-time.

3. The method of claim 1, wherein generating the identifier further comprises extracting the identifier template from the external service registry.

4. The method of claim 3, further comprising selecting, based on the metadata, one or more external services.

5. The method of claim 4, further comprising loading an application configured to further process the requested content.

6. The method of claim 5, further comprising providing the requested content to a workflow process engine.

7. The method of claim 6, further comprising displaying the requested content on a display device.

8. The method of claim 6, further comprising providing the requested content to a human user via a software application appropriate to the data type.

* * * * *